United States Patent Office 3,681,197
Patented Aug. 1, 1972

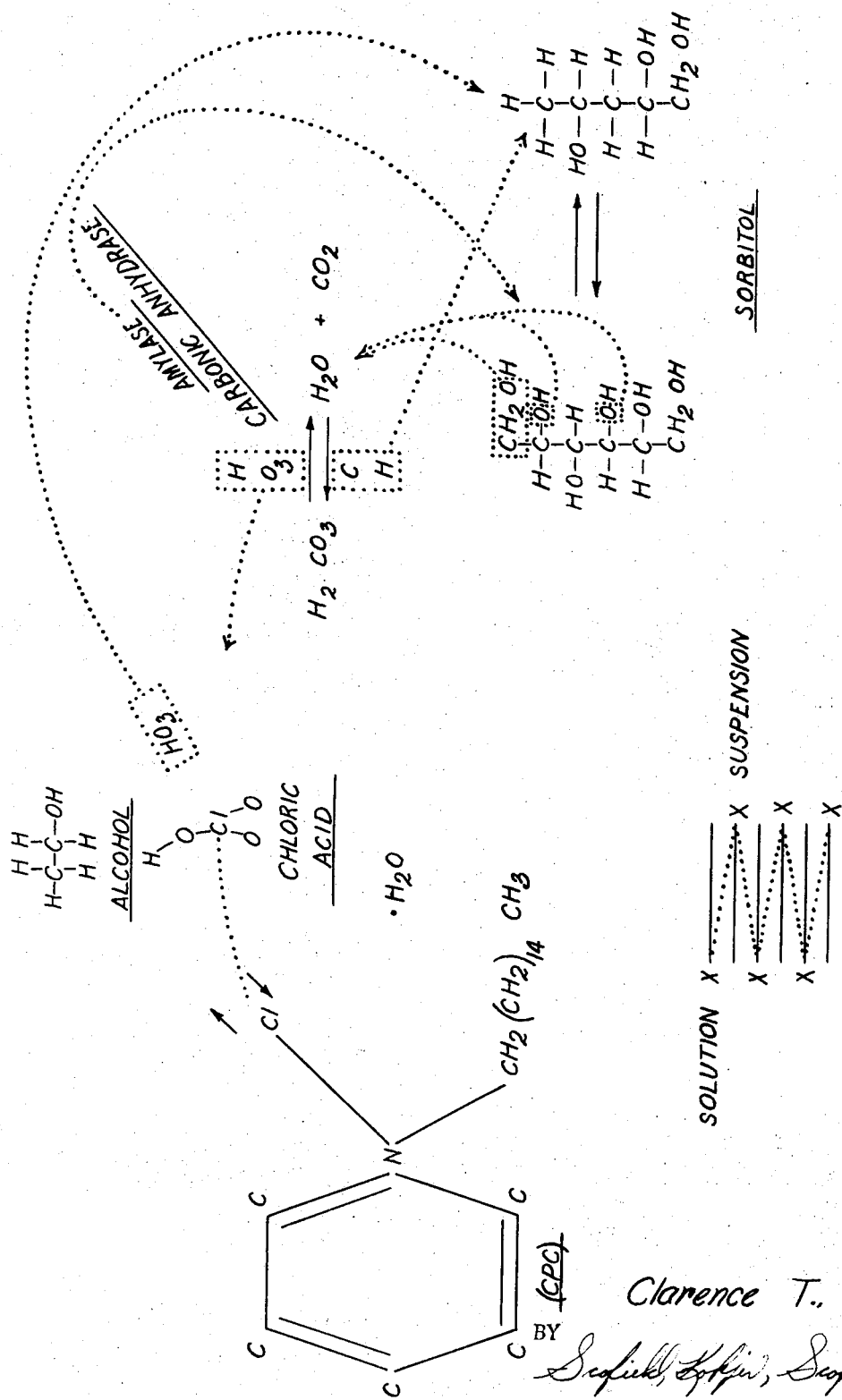

3,681,197
METHOD AND SOLUTION FOR MAINTAINING BIOLOGICAL ACTIVITY IN ENZYMES
Clarence T. Smith, 801 W. 75th St.,
Kansas City, Mo. 64114
Filed Jan. 2, 1969, Ser. No. 788,597
Int. Cl. A61k 19/00; C07g 7/02
U.S. Cl. 195—63
21 Claims

ABSTRACT OF THE DISCLOSURE

A process and method of solubilizing enzymes in such manner as to retain their biological activity over a long period of time or shelf life and a biologically active solution of enzymes which retains said biological activity over a long period of time and shelf life. A method of solubilizing enzymes whereby to retain their biological activity over long periods of time which utilizes (1) amylopsin and carbonic anhydrase, (2) a carbohydrate suitable as a substrate for the amylopsin and (3) cetyl pyridinium chloride or $NH_4Cl$. The solution for maintaining amylopsin in biologically active condition (with or without other enzymes added thereto also retained in biological activity over long periods of time) containing, in addition to the amylopsin and other optional enzymes, carbonic anhydrase, $NH_4Cl$ or cetyl pyridinium chloride and a carbohydrate suitable as a substrate for the amylopsin ($NH_4Br$ as an option).

---

An object of the invention is to provide new methods of and processes for controlling and stopping or at least long delaying the denaturing of enzymes.

Another object of the instant invention is to provide a solution which will maintain amylopsin in biologically active condition for an indefinite period by utilizing a cyclic chemical reaction set up with the amylopsin when cetyl pyridinium chloride, $NH_4Cl$, $NH_4Br$ or others, sorbitol or other suitable carbohydrate substrates for the amylopsin and carbonic anhydrase are present in a solution of water and ethyl alcohol.

Another object of the invention is to provide an improved process for solubilizing in biologically active solution a multiplicity of enzymes including amylopsin, the reaction of amylopsin, carbonic anhydrase and cetyl pyridinium chloride (or $NH_4Br$, $NH_4Cl$) maintaining all of the enzymes in biologically active condition over a long period of time or shelf life.

Another object of the invention is to provide long term biologically active solutions of (1) amylopsin alone, (2) amylopsin and another amylytic enzyme, (3) amylopsin and a proteolytic enzyme, (4) amylopsin and a lipolytic enzyme, (5) amylopsin and a cellulytic enzyme or (6) amylopsin and mixtures of these types of enzymes.

An object of the invention is to provide a new biologically active solution of enzymes which is suitable and useful as an oral mouthwash, particularly in debriding organic particles in the oral cavity.

Another object of the invention is to provide a biologically active solution of enzymes which is suitable for use in ear, nose and throat application, such as, for example, otitis media and externa and as a maxillary sinus washing.

Another object of the invention is to provide a biologically active solution of enzymes which is suitable for genitourinary use such as for intra-urethral and urinary bladder washings.

Another object of the invention is to provide a process and solution for dissolving vegetation stalks after harvest whereby to initiate fermentative action on vegetation stalks after harvest whereby to more quickly return the stalk nutrients therein back to the soil and aid in the exposure of plant larvae, for example, corn borer larvae.

Another object of the invention is to provide a biologically active solution of enzymes which will be useful in processing vegetation residues in a step towards the manufacture of paper.

The figure is a schematic diagram of the solution elements with dotted lines indicating hypothetical reaction processes.

THE INVENTION

Enzymes denature in water and ethyl alcohol, but not where this solution plus amylopsin and carbonic anhydrase are present. If amylopsin is added to the solution with (a) its substrate—(sorbitol) (b) carbonic anhydrase, and (c) a halogen containing compound of the nature of $NH_4Cl$, $NH_4Br$ or CPC, amylopsin will not appreciably denature, alone, nor will the other additive enzymes.

Therefore, the process is first to form a solution of water, ethyl alcohol, CPC (or $NH_4Cl$ or $NH_4Br$) and buffer the pH to the value desired. Secondly, I add, before any enzyme is added, the substrate of amylopsin, namely, sorbitol. Alternatively, one can add the substrate for some other amylolytic enzyme. Next, one adds amylopsin or the other said amylolytic enzyme with carbonic anhydrase. In itself, this is the basic invention process. However, a next step then may be to add either another amylolytic enzyme, a proteolytic enzyme, a lipolytic enzyme, or a cellulytic enzyme, or combinations thereof, to achieve various desired effects.

Other amylolytic enzymes are diastase of malt and diastase Taka (Koji). Proteolytic enzymes are papain and trypsin. A lipolytic enzyme is steapsin and a cellulytic enzyme is cellulase obtained from *Aspergillus niger*.

These enzymes are tested on known and established substrates after they are in solution to demonstrate their biological activity in the regular manner. The enzyme itself then may be tested again after a longer time interval to demonstrate the long term effects. Ordinarily enzyme solutions denature or deteriorate (lose biological activity) in a matter of minutes, hours or, at best, days, depending on the enzyme, substrate, concentration of enzyme and substrate, H ion concentration, temperature, reaction products, light, etc. (see standard texts). My solutions (for example, see the multiple enzyme solution, Example I) have demonstrated unimpaired biological activity for several months (8–9 weeks) and the Example I solution 7½ months. Thus, trypsin is tested on gelatine, U.S.P., while papain is tested by the milk clot test. Cellulase, designated 1,000, 2,000, or 3,000, 4,000, etc. according to the amount hydrolyzed, is tested on carboxy methyl cellulose or methyl cellulose. Steapsin is tested on lard, U.S.P., or clarified cotton seed oil without oxygen inhibitor. Amylase is tested on starches. This is how one identifies the desired effects in action initially and after the time delay.

For a triad enzyme solution (solution with three solubilized enzymes) amylopsin, cellulase and papain are best.

As a chlorine donor, instead of CPC, ammonium chloride, or, for a bromine donor, $NH_4Br$ may be used. What is needed is a polar, covalent bonded chlorine, or bromine, that is an amide type of chlorine or bromine (for example, CPC, $NH_4Cl$ and $NH_4Br$).

With respect to pH, solution pH varies from 6.8 to 7.6 with opitmum at 7.2. Temperature is significant re cyclic reactivity (see hypothetical reaction mechanism below). In medical applications, specific compatabilities or incompatabilities must be considered, such as systemic alkylosis or acidosis. Further, with respect to very cold climates, for example, the system may be kept at an incompatible pH until just before use with adjustment of the pH at that time. Intravenous pH is 7.45.

With respect to buffers, I prefer the sodium and potassium phosphates, but any may be used to control the pH, particularly in industrial uses.

EXAMPLE I

A specific example of the process for putting the enzymes in pancreatin into solution together with papain and cellulase in such manner as to retain their biological activity and also a specific example of the solution itself, once all the ingredients have been added, are as follows (per liter):

(1) Distilled or demineralized water—622 ml.
(2) Cetyl pyridinium chloride—3.75 gr., 5.625 gr. or 7.5 gr. (1:4000, 1:3000, 1:2000)
(3) Ethyl alcohol diluted U.S.P.—250 ml. to make a 12.5% solution
(4) D-sorbitol (70% solution)—128 ml.
(5) Sodium phosphate dibasic anhydrous—4.3 gr.
(6) Potassium phosphate monobasic—2.0 gr. The latter two are to buffer to a pH of 7.2
(7) Pancreatin containing amylopsin, trypsin and steapsin (and carbonic anhydrase which is inherently present in or with pancreatin)—1.5 gr.
(8) Papain—one gr.
(9) Cellulase—1.5 gr.

Immediately prior to placing pancreatin in solution, a final pH determination is made. The pH at this time is 7.2 and the temperature is 21° centigrade.

Example of purpose of use: A basic solution for an enzymatic mouthwash in an oral hygiene preparation.

In the mouthwash use, on a commercial basis, typically, a certified color and flavoring agents would be employed. Chlorophyll could optionally also be added.

Theoretic analysis of action (see FIG. 1)

At the time the pancreatin is put in solution, amylopsin (amylase) immediately begins to hydrolyze the sorbitol molecule with carbonic anhydrase (contained in pancreatin) acting as a catalyst. At the beginning of hydrolysis, the sorbitol molecule gives up $H_2CO_3$ and is reduced to $C_5H_{12}O_3$. In the presence of carbonic anhydrase, the free $H_2CO_3$ undergoes the reversible reaction $H_2CO_3 \rightleftarrows H_2O + CO_2$.

Since chlorine is incompatible with ethyl alcohol, the chlorine atom in the CPC molecule becomes unstable as a result of ethyl alcohol in the solution. However, until such time that free protons are available to the chlorine atom, it remains, though unstable, in the CPC molecule. Hence, at such time that free oxygen and hydrogen atoms are made available as a result of amylopsin beginning to partially hydrolyze the sorbitol molecule the chlorine atom releases from its nitrogen bond in the CPC molecule, reducing CPC to simple CP.

At the point of atom exchange in the reversible reaction, $H_2CO_3 \rightleftarrows H_2O + CO_2$, the chlorine atom groups with $HO_3$, resulting in the formation of the halogen oxyacid, chloric acid.

When the chloric acid is formed, there is left one hydrogen atom, and one carbon atom free to regroup.

The free carbon and hydrogen atoms move toward their former positions in the sorbitol molecule, displacing the proximal hydrogen bond in the altered sorbitol molecule. Simultaneously, the $HClO_3$, being a strong proton donor gives up these three oxygen atoms, and repels the remaining H atom, all of which return to their original positions in the sorbitol molecule.

The chlorine atom, upon giving up the oxygen and hydrogen atoms, regroups with CP at the nitrogen bond, thereby reforming CPC.

At this time all original ingredients have returned to their individual identities in solution, and the entire cycle begins to occur again as amylopsin begins to rehydrolyze the sorbitol molecule.

The cycle is reproduced with great rapidity, possibly every few milliseconds and the solution affords a positive Tyndall effect to support this theoretical rapidity.

This is an oscillation between a solution and a suspension.

Substrates

Although the previously described cycle may be initiated by utilizing various of the individual carbohydrates, acting as a solution substrate for amylase, D-sorbitol is uncommonly desirable for this purpose because of its slow reducing qualities and its unique preservative qualities, especially of cellulase. However, the particular qualities of D-sorbitol do not in any way detract from the usefulness of other suitable carbohydrates as solution substrates, acting to initiate a primary step in the previously described cycle.

Several of the more common examples would be:

(1) D-glucose
(2) D-mannose
(3) D(−)-fructose

Halogen donors

Similarly, that part of the cycle that involves the shifting of the chlorine atom from its original molecular position, to its regrouping with $HO_3$ to form chloric acid, then in turn immediately donating its protons, and returning to its original molecular position, is by no means restricted to the exclusive employment of cetyl pyridinium chloride for that purpose, alone.

Cetyl pyridinium chloride is particularly desirable because the position of the chlorine atom in the cetyl pyridinium chloride molecule facilitates its uncomplicated release, due to the instability of chlorine in the presence of ethyl alcohol. So long as a stronger electronegative attraction is absent, it remains, unstably, in its original molecular position in the CPC molecule. However, when a sufficiently strong electronegative attraction becomes available ($HO_3$), the molecular position of the chlorine atom allows its simple release, for bonding with the stronger electronegative attraction. As previously explained, the resultant formation of chloric acid, which is a strong proton donor, releases the three oxygen atoms, repelling the remaining H atom, that returns to regroup in the carbohydrate molecule, leaving the chlorine to unstably rebond in its original CPC molecular position.

Certainly, there are other suitable chlorides to utilize for this purpose, but the ones most suitable are those whose chlorine atom is in such molecular position as to facilitate a relatively synchronous shifting from, and back to, its original molecular position.

A practical example of this would be to utilize ammonium chloride for this purpose.

Also certain bromide molecules, whose bromine atom is molecularly positioned similarly, or identically to, that of those appropriate molecular structures containing chlorine, are equally suitable for the purpose of facilitating the same part in the cycle that is facilitated by chlorine.

A practical example would be that of utilizing ammonium bromide.

Cycle initiation

Amylase (amylopsin), with carbonic anhydrase, is present in all of the solutions with a suitable carbohydrate substrate, serving as initiators of the cycle.

Although it is not theoretically impossible to utilize other classes of enzymes, together with carbonic anhydrase, and their respective suitable substrates, acting as cycle initiators, it is my opinion that all classes of enzymes, other than the amylases, are probably unsatisfactory as cycle initiators. Perhaps it is more correct to state that there is no unsatisfactory quality of the other classes of enzymes as cycle initiators, per se, however, the various specific substrates are almost universally unsuitable due to their lack of capacity to beneficially contribute in the initiatory phase of the cycle. And it is for this reason that classes of enzymes, other than the amylases, are presently daleted for the role of cycle initiators.

Although pancreatic amylase (amylopsin) is the most commonly employed amylase in these formulae, this should in no way detract from the usefulness of the other diastases, i.e., diastase of malt and diastase Tako (Koji). However, since these latter diastases necessarily require an extraneously obtained source of carbonic anhydrase (e.g., from beef erythrocytes) to facilitate the reversible reaction of $H_2CO_3 \rightleftharpoons H_2O + CO_2$, in the cycle, diastate of malt and diastase Taka (Koji) are not as convenient for use as is amylopsin.

Other solutions

The following formulae are examples of solutions that serve to retain the biological activity of one or more of the different classes of enzymes, i.e., amylases, proteases, lipases and cellulases.

Examples

The following formulae are examples of various solutions containing one or more enzymes. However, it must be appreciated that greater or lesser amounts of any of all ingredients in any individual formula may be specifically adjusted to meet specific needs. Also, the pH of any formula may be reestablished for the purpose of accomplishing specific pH compatibilities or incompatibilities. Since the solutions may somewhat vary, quantitatively, depending on their specific intended uses, the quantities of ingredients are to be taken as illustrative and not limiting as they are solely relevant to the purpose of use. Also, rather than to exclusively emphasize the importance of the quantities of the various ingredients, it must primarily be appreciated that all necessary ingredients for the initiating, and sustaining, the cycle must be present in suitable pH and equilibrium, as previously established.

EXAMPLE II

Sample formula of solution with amylase being the only enzyme in solution (excepting carbonic anhydrase whose action is coenzymatic in the solution):

(1) Water (distilled or demineralized) (622 ml.)
(2) Ammonium chloride (or other suitable chlorides or bromides as previously described) (3.75 gr.)
(3) Ethyl alcohol diluted U.S.P., 250 ml.
(4) D-sorbitol (or other suitable carbohydrates as previously described) 70% solution, 128 ml.
(5) Phosphate buffers (4.1 gr.) of sodium phosphate dibasic heptahydrate, potassium phosphate monobasic (2 gr.), etc.
(6) Pancreatic amylase (amylopsin or other suitable diastases plus carbonic anhydrase) with carbonic anhydrase being inherently present with amylopsin (65 mg. or 1 gr.)

Example of purpose of use: as a basic solution for adding other classes of enzymes to the solution, retaining their biological activity.

EXAMPLE III

Sample formula of solution containing amylopsin and steapsin (1) Water (distilled sterile) (892 ml.)
(2) Ammonium chloride (approximately 0.1% of solution) (15 gr.)
(3) Ethyl alcohol diluted U.S.P. (approximately 0.4% of solution) (8 ml.)
(4) D-mannose (or glucose) 50% solution (approximately 5% of solution) (100 ml.)
(5) Sodium phosphate dibasic heptahydrate (solution buffered to pH 7.45) (1½ gr.)
(6) Pancreatic amylase (amylopsin) (containing the carbonic anhydrase inherent to pancreatic amylase and steapsin) (48 mg.)
(7) Pancreatic lipase (steapsin) (same comment) (1½ gr.)

Example of purpose of use: Pancreatic lipase, steapsin, exerts lipolytic action on intra-arterial fatty plaques and deposits. In addition to the lipolytic action on intra-arterial fatty deposits, there also occurs an esterifying of cholesterol as well (explanation: pancreatin, which is the dried extract of hog (or ox) pancreas and contains a cholesterol esterase which hydrolyzes cholesterol esters, and also has the reverse, or esterifying action).

EXAMPLE IV

Sample formula of solution with amylase and cellulase (1) Water (demineralized or distilled) (550 ml.)
(2) Ammonium chloride or ammonium bromide (7.5 gr.)
(3) Ethyl alcohol diluted U.S.P. (200 ml.)
(4) Fructose (or other suitable carbohydrate as previously described) 50% solution (250 ml.)
(5) Phosphate buffers: sodium phosphate dibasic (1 gr.) potassium phosphate monobasic (.5 gr.)
(6) Amylase (amylopsin) containing inherent carbonic anhydrase (1 gr.)
(7) Cellulase (obtained from *Aspergillus niger*) (3 gr.)

Example of purpose of use: For spraying on corn stalk, and certain other field stubbles, to initiate fermentative activity to decompose the stubble, thereby releasing minerals contained in the stubble, plus supplying ammonium ions, contained in the solution, to increase and enrich the mineralization of the soil.

Also with addition to solution of certain microorganisms (i.e., certain streptococcic and homolatic strains) to digest the glucosidic linkage which binds glucose molecules together in forming cellulose, thereby recovering glucose from vegetative fibers (wood, pulp, corn stalks, pea and bean vines, etc.).

EXAMPLE V

Sample formula of solution containing amylopsin and trypsin and/or papain (1) Water (distilled or demineralized) 838 ml.
(2) Ammonium chloride (approximately 0.1% of solution) 15 gr.
(3) Ethyl alcohol diluted U.S.P. 40 ml.
(4) D-sorbitol (70% solution)
(5) Phosphate buffers: Sodium phosphate dibasic heptahydrate 1.5 gr. Potassium phosphate monohydrate 0.5 gr. (pH 7.2)
(6) Pancreatic amylase (amylopsin) (containing the carbonic anhydrase inherent to pancreatic amylase) 1 gr.
(7) Trypsin 1 gr.
(8) Papain (either trypsin or papain alone may be used or both together) 1 gr.

Example of purpose of use: As a dermatologic lotion to debride and cleanse dermal lesions before applying or treatment with specific medicinal agents. Secondly, as a vaginal douche adjusted with respect to pH for vaginal disorders, for example cervical erosion, vaginitis or leucorrhea.

In all examples, it is assumed that the pH is adjusted to 7.2 unless otherwise specified or unless specific conditions requiring specific pH's are desired. All of the example solutions, except that which is used for sugar recovery, may be regarded as anti-septic.

Reference definitions (Merck Index)

Amylopsin—(animal diastase) starch-digesting principle of pancreatic juice. One part is said to convert 250 parts starch into dextrose in 3 hours. It acts best at about 40° C. and in a slightly alkaline medium. Even a slight acidity checks its action or destroys it.

Carbonic anhydrase—(chloroform enzyme) An enzyme which controls the rate at which carbon dioxide combines with water in an organism. Reversibly catalyzes the reaction $H_2O + CO_2 \rightleftharpoons H_2CO_3$ which is of fundamental importance to life on this planet. In the human body, carbonic anhydrase controls the rate of reaction between carbon dioxide and water in the kidneys, so that a normal acid urine is produced.

Pancreatin—(diastase versa) substance from the fresh pancreas of the hog or ox containing the enzymes amylopsin, trypsin, and steapin. It converts not less than 25 times its weight of starch into soluble carbohydrates and not less than 25 times its weight of casein into proteoses within five minutes. Its greatest activity is exhibited in neutral or faintly alkaline media.

Sorbitol—D-Sorbitol; D-glucitol. $C_6H_{14}O_6$: molecular weight 182.17; C 39.5, 6%; H 7.7, 5%; O 52.7, 0%. In the healthy human organism one gram of sorbitol yields 3.9940 calories which is comparable to 3.94 calories from 1.0 gram of cane sugar. 70% of orally ingested sorbitol is converted to carbon dioxide without appearing as glucose in the blood. Used in candy manufacture, in pharmaceutical compounding, as sugar substitute for diabetics and to increase absorption of vitamins and other nutrients in pharmaceutical preparations.

Trypsin—proteolytic enzyme from the pancreas. Converts proteins at the body temperature and in alkaline solution into soluble proteoses. Active between pH 5 and 8. Most active in the near neutral range. Solutions lose 75% of their potency within three hours of room temperature. Medical use topically or by local injection for debridement of necrotic and pyogenic surface lesions. Has also been injected into subcutaneous hematomas.

Amylase concentrate, bacterial—agrozyme, described as a bacterial amylase concentrate. Used in feed supplements. Enhances the nutritional value of barley feed to the point where it approaches that of corn.

Papain—vegetable pepsin, contains enzymes similar to pepsin, but acting in acid neutral or alkaline media. Usual grade digests about 35 times its weight of lean meat.

I claim:

1. A method of putting amylopsin with carbonic anhydrase into solution with the amylopsin retaining its biological activity comprising
first preparing a substantially sterile solution containing water, one of $NH_4Cl$, $NH_4Br$ and cetyl pyridinium chloride, ethyl alcohol and any carbohydrate suitable as a substrate for the amylopsin,
establishing a pH of 6.8 to 7.6 in said solution,
and thereafter adding amylopsin with carbonic anhydrase to said solution.

2. A method of putting the enzymes in pancreatin into a solution in such manner as to retain their biological activity comprising,
first preparing a substantially sterile solution containing water, one of $NH_4Cl$, $NH_4Br$ and cetyl pyridinium chloride, ethyl alcohol and a carbohydrate suitable as a substrate for the amylopsin in the pancreatin,
establishing a pH of 6.8 to 7.6 in said solution,
and thereafter adding pancreatin thereto.

3. A method of putting an amylolytic enzyme with carbonic anhydrase into solution in such manner as to retain its biological activity, comprising
first preparing a substantially sterile solution containing water, one of $NH_4Cl$, $NH_4Br$ and cetyl pyridinium chloride, ethyl alcohol, and a carbohydrate suitable as a substrate for the amylolytic enzyme,
establishing a pH of 6.8 to 7.6 in said solution,
and thereafter adding the amylolytic enzyme with carbonic anhydrase to said solution.

4. A method as in claim 3 wherein the amylolytic enzyme is amylopsin.

5. A method of putting an amylolytic enzyme with carbonic anhydrase and a protease into solution in such manner as to retain their biological activity comprising
first preparing a substantially sterile solution containing water, one of $NH_4Cl$, $NH_4Br$ and cetyl pyridinium chloride, ethyl alcohol and any carbohydrate suitable as a substrate for the amylolytic enzyme,
establishing a pH of 6.8 to 7.6 in said solution,
and thereafter adding the amylolytic enzyme with carbonic anhydrase and a protease to said solution.

6. A method of putting an amylolytic enzyme with carbonic anhydrase and steapsin into solution in such manner as to retain their biological activity comprising
first preparing a substantially sterile solution containing water, one of $NH_4Cl$, $NH_4Br$ and cetyl pyridinium chloride, ethyl alcohol and a carbohydrate suitable as a substrate for the amylolytic enzyme,
establishing a pH of 6.8 to 7.6 in said solution,
and thereafter adding the amylolytic enzyme with carbonic anhydrase and steapsin to said solution.

7. A method of putting an amylolytic enzyme with carbonic anhydrase and a cellulytic enzyme into solution in such manner as to retain their biological activity comprising
preparing a substantially sterile solution containing water, one of $NH_4Cl$, $NH_4Br$ and cetyl pyridinium chloride, ethyl alcohol and any carbohydrate suitable as a substrate for the amylolytic enzyme,
establishing a pH of 6.8 to 7.6 therein,
and thereafter adding the amylolytic enzyme with carbonic anhydrase and a cellulytic enzyme to the solution.

8. A substantially sterile active enzymatic solution containing
water, one of $NH_4Cl$, $NH_4Br$ and cetyl pyridinium chloride, ethyl alcohol, and a carbohydrate suitable as a substrate for amylopsin,
the solution having a pH of 6.8 to 7.6.
and containing amylopsin with carbonic anhydrase, the amylopsin with carbonic anhydrase added to the other ingredients of the solution after the pH is established.

9. A substantially sterile active enzymatic solution containing water, one of $NH_4Cl$, $NH_4Br$ and cetyl pyridinium chloride, ethyl alcohol, and a carbohydrate suitable as a substrate for amylopsin,
the solution having a pH of 6.8 to 7.6,
and amylopsin with carbonic anhydrase and a proteolytic enzyme, the amylopsin with carbonic anhydrase and proteolytic enzyme added to the other ingredients of the solution after the pH is established.

10. A substantially sterile active enzymatic solution containing water, one of $NH_4Cl$, $NH_4Br$ and cetyl pyridinium chloride, ethyl alcohol, and a carbohydrate suitable as a substrate for amylopsin,
the solution having a pH of 6.8 to 7.6,
and containing amylopsin with carbonic anhydrase and an amylolytic enzyme,
the amylopsin with carbonic anhydrase and the amylolytic enzyme added to the other ingredients of the solution after the pH is established.

11. A substantially sterile active enzymatic solution containing water, one of $NH_4Cl$, $NH_4Br$ and cetyl pyridinium chloride, ethyl alcohol, and a carbohydrate suitable as a substrate for amylopsin,
the solution having a pH of 6.8 to 7.6,
and containing amylopsin with carbonic anhydrase and a lipolytic enzyme,
the amylopsin with carbonic anhydrase and lipolytic enzyme added after the pH is established.

12. A substantially sterile active enzymatic solution containing water, one of $NH_4Cl$, $NH_4Br$ and cetyl pyridinium chloride, ethyl alcohol, and a carbohydrate suitable as a substrate for amylopsin,
the solution having a pH of 6.8 to 7.6,
and containing amylopsin with carbonic anhydrase and a cellulytic enzyme, the amylopsin with carbonic anhydrase and cellulytic enzyme added after the pH is established.

13. A solution as in claim 9 wherein the proteolytic enzyme is one of the group of trypsin and papain.

14. A solution as in claim 10 wherein the amylolytic enzyme is one of the group of amylase diastase Taka (Koji) and diastase of malt.

15. A solution as in claim 11 wherein the lipolytic enzyme is steapsin.

16. A solution as in claim 12 wherein the cellulytic enzyme is one of the group consisting of cellulase.

17. A method as in claim 1 including adding one of trypsin and papain thereto.

18. A method as in claim 1 including adding one of amylase diastase Taka (Koji) and diastase of malt thereto.

19. A method as in claim 1 including adding steapsin thereto.

20. A method as in claim 1 including adding cellulase thereto.

21. A process for preparing a solution to receive and to maintain in biological activity an amylolytic enzyme with carbonic anhydrase, said process comprising the steps:

preparing a substantially sterile solution containing water, a halogen containing compound selected from the group consisting of ammonium chloride, ammonium bromide, and cetyl pyridinium chloride, ethyl alcohol and a carbohydrate suitable as a substrate for the amylolytic enzyme and establishing a pH of 6.8 to 7.6 therein before adding the amylolytic enzyme with carbonic anhydrase.

References Cited
UNITED STATES PATENTS 1,003,124   9/1911   Rohm _____ 195—64 X
2,446,792  10/1948   Shelton et al. _____ 424—54 X LIONEL M. SHAPIRO, Primary Examiner U.S. Cl. X.R.

195—68; 424—50, 94